United States Patent
Rosenblum et al.

(10) Patent No.: US 6,856,907 B2
(45) Date of Patent: Feb. 15, 2005

(54) METHOD FOR PLANNING, COMMUNICATING AND EVALUATING PROJECTS THAT IMPACT THE ENVIRONMENT

(75) Inventors: Eric Rosenblum, San Jose, CA (US); Richard W. Harris, Berkeley, CA (US); Lawrence F. Byers, Palo Alto, CA (US)

(73) Assignee: Envirospectives, Inc., San Jose, CA (US)

(*) Notice: Subject to any disclaimer, the term of this patent is extended or adjusted under 35 U.S.C. 154(b) by 82 days.

(21) Appl. No.: 10/117,361

(22) Filed: Apr. 5, 2002

(65) Prior Publication Data

US 2002/0178179 A1 Nov. 28, 2002

Related U.S. Application Data

(60) Provisional application No. 60/282,302, filed on Apr. 5, 2001.

(51) Int. Cl.$^7$ .............................................. G06F 19/00
(52) U.S. Cl. .............................................. 702/2; 702/5
(58) Field of Search ............................. 702/2, 5; 703/5

(56) References Cited

U.S. PATENT DOCUMENTS

| | | | |
|---|---|---|---|
| 5,321,613 A | | 6/1994 | Porter et al. |
| 5,654,886 A | | 8/1997 | Zereski, Jr. et al. |
| 5,808,916 A | * | 9/1998 | Orr et al. ................ 703/6 |
| 5,815,417 A | * | 9/1998 | Orr et al. ................ 703/5 |
| 5,831,876 A | * | 11/1998 | Orr et al. ................ 703/6 |
| 6,064,943 A | | 5/2000 | Clark, Jr. et al. |
| 6,292,830 B1 | * | 9/2001 | Taylor et al. ............ 709/224 |
| 6,332,155 B1 | * | 12/2001 | Notani .................. 709/205 |
| 6,334,146 B1 | * | 12/2001 | Parasnis et al. ........ 709/217 |
| 6,341,287 B1 | * | 1/2002 | Sziklai et al. ............ 707/102 |
| 2002/0026339 A1 | * | 2/2002 | Frankland et al. ........ 705/7 |
| 2002/0035550 A1 | * | 3/2002 | Sakurai et al. ........... 705/400 |
| 2002/0042731 A1 | * | 4/2002 | King et al. .............. 705/10 |
| 2003/0014342 A1 | * | 1/2003 | Vande Pol ............... 705/36 |
| 2004/0006566 A1 | * | 1/2004 | Taylor et al. ............ 707/100 |

OTHER PUBLICATIONS

Planning Design and Construction Office of the University of California, Office of the President, UC CEQA Handbook, 1991–2002 Handbook Update and Revisions, . . . pp. 1.1–1 et seq, University of California, U.S.A.

(List continued on next page.)

*Primary Examiner*—Donald E. McElheny, Jr.
*Assistant Examiner*—Anthony Gutierrez
(74) *Attorney, Agent, or Firm*—Mark A. Thomas

(57) ABSTRACT

A method for electronically planning, evaluating, representing and communicating environmental information about site characteristics and the impact of proposed activities, through visualization, modeling and/or decision support modules, which support the shared public and private evaluation of project alternatives for improved environmental management decisions. In an embodiment of the present invention, a method for providing an electronic environmental project document comprises the steps of receiving project information regarding an environmental project, indexing the information by attaching metadata, providing a document preparation guide in response to the project information, receiving information requested in the document preparation guide, preparing an electronic environmental project document and employing software to visualize, model and/or provide decision support. In another embodiment of the present invention, environmental project impacts are visualized through the use of graphs, tables, icons, photos, video and/or animation and forecasting and backcasting models are employed to support the development of consensus solutions.

32 Claims, 13 Drawing Sheets

OTHER PUBLICATIONS

U.S. Department of Energy, California Energy Commission, Oregon Department of Energy and Washington State Energy Office, . . . The Energy Yardstick: Using Place3s to Create More Sustainable Communities, Aug. 1996, pp. 1 et seq, U.S. Dept. of Energy, U.S.A.

Chris Fulcher, Tony Prato and Yan Zhou, Economic and Environmental Impact Assessment Using a Watershed Management Decision Support Tool, . . . 1997, pp. 1–17, Environmental Systems Research Institute (ESRI), U.S.A.

California Department of Transportation Project Development Workflow Tasks (PWDT), Guidelines for the Preparation of Project Study Reports, . . . Dec. 8, 1999, pp. 1–6, California Department of Transportation, U.S.A.

Mike McKeever, Nancy Hanson, Ron Thomas, Ken Snyder, Common Values, Information and Analytical Needs of Sustainable Communities, Healthy Communities and . . . Civic Engagement Initiatives, Feb. 2, 1999, pp. 1–7.

David Stockwell. Peter Arzberger, Tony Fountain, John Helly, An Interface between Computing, Ecology and Biodiversity: Environmental Informatics, Oct., 1999, . . . pp. 1–13, San Diego Supercomputer Center.

Mark Lavigne, E–Government: Creating Tools of the Trade, Oct., 2000, pp. 1–3, Center for Technology in Government, SUNY at Albany, U.S.A.

Mordechay Haklay, Conceptual Models of Urban Environmental Information Systems—Towards Improved Information Provision, Oct. 2001, pp. 1–35, . . . Centre for Advanced Spatial Analysis, University College of London, United Kingdom.

Laurel Chesky, Reality Check: Monterey County's Electronic Community Planning Model Proves We Can't Have It All, Mar. 22, 2001, pp. 1–2, Coast Weekly, U.S.A.

USEPA Office of Research and Development, User Guide and Data Administration Guidelines for the USEPA's Environmental Information Management System (EIMS), Oct., 2001, . . . pp. 1–1 et seq., U.S. E.P.A., U.S.A.

Gregory Unruh, Can the Internet Help Slow Global Decline?, Nov., 2001, pp. 1–12, First Monday (vol. 6, No. 11).

Deborah Thompson, Web–Based Environmental Information Management Systems, Nov., 2001, pp. 1–8, Groundwater Foundation Fall Conference, U.S.A.

* cited by examiner

ATTENTION:

Your project is located in _____ County. _____ County currently has ___ EIRs in processing through the State Clearinghouse. /— 500

Do you wish to share/use data with these projects? ■ Yes ■ No  /— 501

Document Publication Information 600

NOTE:

Text of project will be stored as _____ file (.doc, .wpd, other)

Graphics of project will be stored as _____ file (.pdf, .jpeg, .tiff, other)

Do you wish to store your files in these formats? ■ Yes ■ No 602

Which documents do you wish to store (check all that apply)? 601

Project Document ■   Decision Support ■

Visualizations ■   Review Comments ■

Modeling Results ■   Bulletin Board Discussion ■

Chat Room Records ■

Fig. 5

Document Preparation Guide

/ 700

I. TABLE of CONTENTS

Project Description
Introduction
Environmental Analysis
    Overview
    Land Use
    Open Space, Recreation, Visual Resources
    Population and Housing
    Traffic and Circulation
    Hydrology and Water Quality
    Air resources

Fig. 6

Document Preparation Guide

800

II. PROJECT DESCRIPTION

- Location
- What is the project?
  - *use of pull down menus and fill-ins as translation to sentences/paragraphs*
  - *prompts for appropriate graphics*
- Construction info
- Operational info
- Project Objectives
- Relationship to other projects

Fig. 7

Document Preparation Guide

III. TRAFFIC/CIRCULATION

- Affected streets and highways: _____  900  901
- What local/regional impact model will you use: _____  902
- Model will generate:
  - diagrams
  - tables
  - spreadsheets
  - visual simulation
  - user experience

Fig. 8

List of Links

LINKS:

- State Clearinghouse/Office of Planning & Research
- Lead Agency
- Applicant website
- Environmental Interest groups
- Academic Research
- Legal Issues
- Media Coverage
- Regulations
- Reference Library

Fig. 10

Fig. 11

METHOD FOR PLANNING, COMMUNICATING AND EVALUATING PROJECTS THAT IMPACT THE ENVIRONMENT

CLAIM OF PRIORITY

The present application claims priority to U.S. Provisional Patent Application Ser. No. 60/282,302 entitled, "A Method for Planning, Evaluating and Communicating Projects that Impact the Environment" filed on Apr. 5, 2001.

FIELD OF THE INVENTION

The present invention relates to the integrated representation, evaluation and communication of project information including site conditions, project impacts and planning data.

BACKGROUND OF THE RELATED

All countries in the industrialized world now require some type of oversight to ensure that environmental impacts caused by proposed projects are mitigated in compliance with local, state and federal environmental laws. New international agreements (e.g. the Kyoto Protocol on global warming) set global standards for pollution abatement and resource use, and the number and complexity of environmental regulations will only increase in years to come. Nevertheless, the project planning, evaluation and review process as currently practiced (including environmental permitting), is fragmented, adversarial and ineffective. The documents are costly and time-consuming to prepare and distribute. The information generated is disparate, poorly visualized, and does not support the identification and development of optimum project alternatives. Partly as a consequence of these difficulties, the process generally fails to prevent degradation of the environment on and around the project site. Furthermore, once it has been gathered the information developed about the project is usually unavailable for later reference, even by related projects of similar type or location.

For example, in the United States, the environmental review and evaluation process currently consists of preparing a detailed paper report containing written descriptions of various project elements including the project setting, project alternatives and estimated impacts and mitigations. Information related to setting and impacts (e.g. traffic, air quality, utility capacity, biological resources, socioeconomic effects etc.) is provided in narrative form or through the use of tables or printed diagrams and photographs. The report is difficult to understand and can exceed one thousand (1,000) pages in length for larger projects. It is usually mailed to affected parties and key stakeholders, as well as filed at libraries or other government sites for public review. Written comments from stakeholders and comments received at public meetings are responded to in writing by the project proposer. At the end of this process, the regulatory body with jurisdictional authority approves or rejects the project based on all collected information, including the public comment and the proposer's response. The process as currently practiced is flawed and ineffective in a number of significant ways, including the following described below.

First, the process of preparing and publishing voluminous paper reports is time-consuming and costly and uses significant amounts of paper and other resources. Long paper-based reports are often incomplete and lack accurate or adequate information about one or more site characteristics or impacts. Neither paper-based reports nor text-based representations of such reports distributed on CD or on the Internet are readily reviewed in a collaborative manner by effected stakeholders, and they do not facilitate extensive searching, integrated evaluation of project impacts, or modeling of future site conditions.

Second, two-dimensional paper reports do not represent key features of the setting or the project in such a way that reviewers (including the general public) can adequately visualize the site or project impacts. Socioeconomic information in particular is not well related either causally or spatially to physical impacts, nor is such non-physical information well represented, to the detriment of a full understanding of the project and its impacts. In fact, much time is spent in the process of preparing text and graphics in an attempt to describe three-dimensional effects.

Third, internal and external stakeholders are not able to quickly receive, track, evaluate and respond to comments. During the review process, project sponsors or their lead agencies must respond to formal comments submitted by affected stakeholders. Even when these comments have been obtained electronically, there does not yet exist a method of cataloging, tallying, sorting or organizing comments according to keywords or areas of concern or acknowledging these comments upon receipt, adding to the time and cost of the response process. There is also no means of allowing commentors to contact one another or to immediately access similar comments made by other stakeholders.

Fourth, there is not a method for identifying and obtaining consensus about criteria with which to evaluate project alternatives and a means of tabulating stakeholder preferences. The criteria used by various reviewers and stakeholders in evaluating the project is nowhere explicitly identified, such that misunderstanding about such criteria becomes a significant barrier to communication about project alternatives and slows down the project implementation process.

Fifth, there is not a method for modeling the integrated effect of various project changes, predicting the collective impacts and representing the resulting future condition of a site. Project reviewers cannot readily determine the impact of alternatives not already identified by the proposer, nor can the proposer easily identify project features required to limit project impacts. In general, the current state of the art has not included capabilities that might accurately predict the total outcome likely to follow a proposed project (forecasting) or the type of project required to produce a given outcome (backcasting).

Sixth, there is not an ability to efficiently publish, store or distribute data contained in environmental documents for future reference. Once the review process is complete (i.e. the project has been approved or rejected), all paper-based information is only accessible by obtaining the final documents and manually locating the data in the appropriate section. Although environmental information is continuously being developed in specific locations for particular projects, there is no method currently in place for the efficient storage and distribution of this information, such that even proposers of projects in the same location must recreate data from scratch. The inefficiencies of the project review process are even more apparent in the case of environmental management, where efforts at regional environmental planning are hampered by the lack of coordinated relevant environmental information.

Present improvements in the "state of the art" with respect to project representation and publication includes distribution of environmental reports on compact disc (CD) or through the internet, either as a photograph of a document or in undifferentiated text format. Visualization techniques have been used for managing individual construction projects (Fischer, 1997); modeling and visualization of traffic impacts (Shiffer, 1996); and modeling and visualization of land use trends in support of municipal general plans (Orr, 1998). In addition, decision support software currently available allows a group of individuals to identify and assign different values to criteria that can then be applied to various alternatives for the purpose of determining the most popular option. However, these techniques have never been integrated into a single program on an interactive platform suitable for use in the practice of environmental planning and management, and project planners and environmental stakeholders rarely utilize them.

An even greater limitation results from the lack of a method of communicating and archiving information for future reference. Recent attempts at creating an archive have been limited to an online summary of environmental documentation received within given state jurisdiction (State of California Office of Planning and Research, 2000). However, as yet there does not exist an efficient and cost-effect means of publishing, storing and distributing environmental information that could accommodate and provide easy access to geographic, physical and socioeconomic data to support regional environmental planning and management efforts.

Therefore, it is desirable to provide a method for preparing and presenting an environmental project document in a cost-effective efficient manner that can easily be viewed and commented on by stakeholders. It is further desirable to provide a method for obtaining consensus information from stakeholders and modeling the integrated effects of various project changes. It is also further desirable to provide a method for efficiently publishing, storing, retrieving and distributing environmental project documents and included environmental information.

SUMMARY

A method for providing an electronic environmental project document is provided. In an embodiment of the present invention, the method comprises the steps of receiving information regarding a land use project or environmental setting and providing a document preparation guide in response to the project information. Environmental information requested in the document preparation guide is received. An electronic environmental project document including the environmental information is then published.

In an embodiment of the present invention, a processing device performs the steps.

In an embodiment of the present invention, the steps are performed by software stored in memory of a processing device coupled to the Internet.

In an embodiment of the present invention, the publishing step includes providing the electronic environmental project document to users on the Internet.

In an embodiment of the present invention, the method further comprises the step of receiving comments regarding the environmental project document.

In another embodiment of the present invention, the providing step further includes providing a first electronic form having an environmental data entry field and label in response to the project information.

In an embodiment of the present invention, the providing step further includes providing a second electronic form having an environmental data entry field and label in response to the project information.

In yet another embodiment of the present invention, the providing step further includes providing a pop-up menu of environmental forms for entering environmental information in response to the project information.

In another embodiment of the present invention, the method further comprises the step of searching a database to obtain environmental information for the environmental project.

In an embodiment of the present invention, the environmental information is stored with an identifier indicating a type of environmental information, wherein the type of environmental information is identified by its geographic location and/or its category (i.e. land use, water, air, traffic, demographic data etc.).

In an alternate embodiment of the present invention, graphics information is added to the project information and the publishing step includes publishing the graphics information.

In an embodiment of the present invention, the graphics information includes video and animation information and the publishing step includes publishing the graphics information.

In an embodiment of the present invention, the method further comprises the step of forecasting an environmental impact in response to the environmental information.

In an embodiment of the present invention, the forecasting step comprises the steps of forecasting a first environmental impact in response to a first type of environmental information and forecasting a second environmental impact in response to a second type of environmental information. A visual representation of the first and second environmental impact is provided.

In an embodiment of the present invention, a method further comprises the step of querying a plurality of users to obtain respective issues of concern and obtaining values associated with the respective issues of concern. The issues are then ranked in response to the respective values.

A method for evaluating an environmental project is provided in an embodiment of the present invention. Project information regarding an environmental project is received. A document preparation guide is provided in response to the project information. Environmental information requested in the document preparation guide is received. An electronic environmental project document including the environmental information is published. Comments regarding the environmental project document are received. An environmental impact is forecast in response to the environmental information. A database is searched to obtain environmental information for the environmental project. A plurality of issues of concern having respective values is obtained.

In an embodiment of the present invention, the steps are performed by a plurality of software modules stored on a computer readable medium.

These and other embodiments of the present invention, as well as other aspects and advantages are described in more detail in conjunction with the figures, the detailed description, and the claims that follow.

BRIEF DESCRIPTION OF THE DRAWINGS

FIG. 5 illustrates a document publication information template according to embodiments of the present invention.

FIGS. 6, 7 and 8 illustrate a document preparation guide according to an embodiment of the present invention.

FIG. 10 illustrates a list of links according to an embodiment of the present invention.

FIG. 11 illustrates a user screen for public communication interface according to an embodiment of the present invention.

DETAILED DESCRIPTION

A method for electronically representing and communicating environmental information about site characteristics and the impact of proposed activities (including visualization, modeling and decision support modules) in a manner that supports the shared public and private evaluation of project alternatives for improved environmental management decisions is provided in an embodiment of the present invention. A method for publishing, storing and distributing such information and techniques for easily accessing environmental information that allows for further analysis and processing of stored information is also provided in an embodiment of the present invention.

Accordingly, project site characteristics, and in particular an electronic environmental project document that includes environmental information regarding a project site and may include forms required by local, state and federal regulations, can be represented more quickly and accurately. In an embodiment of the present invention, environmental information includes socioeconomic data such as per capita income. Project impacts can be more readily estimated and visualized. Environmental information can be more reliably stored and accessed. Stake holder input can be incorporated into a project plan as well. Overall, integrated use of embodiments of the present invention will allow individuals and groups to plan and build sustainable projects that meet a greater range of public and private needs. In addition to supporting environmental planning and management activities, embodiments of the present invention can be used for the planning, design and construction of various other types of projects.

Figure 1:
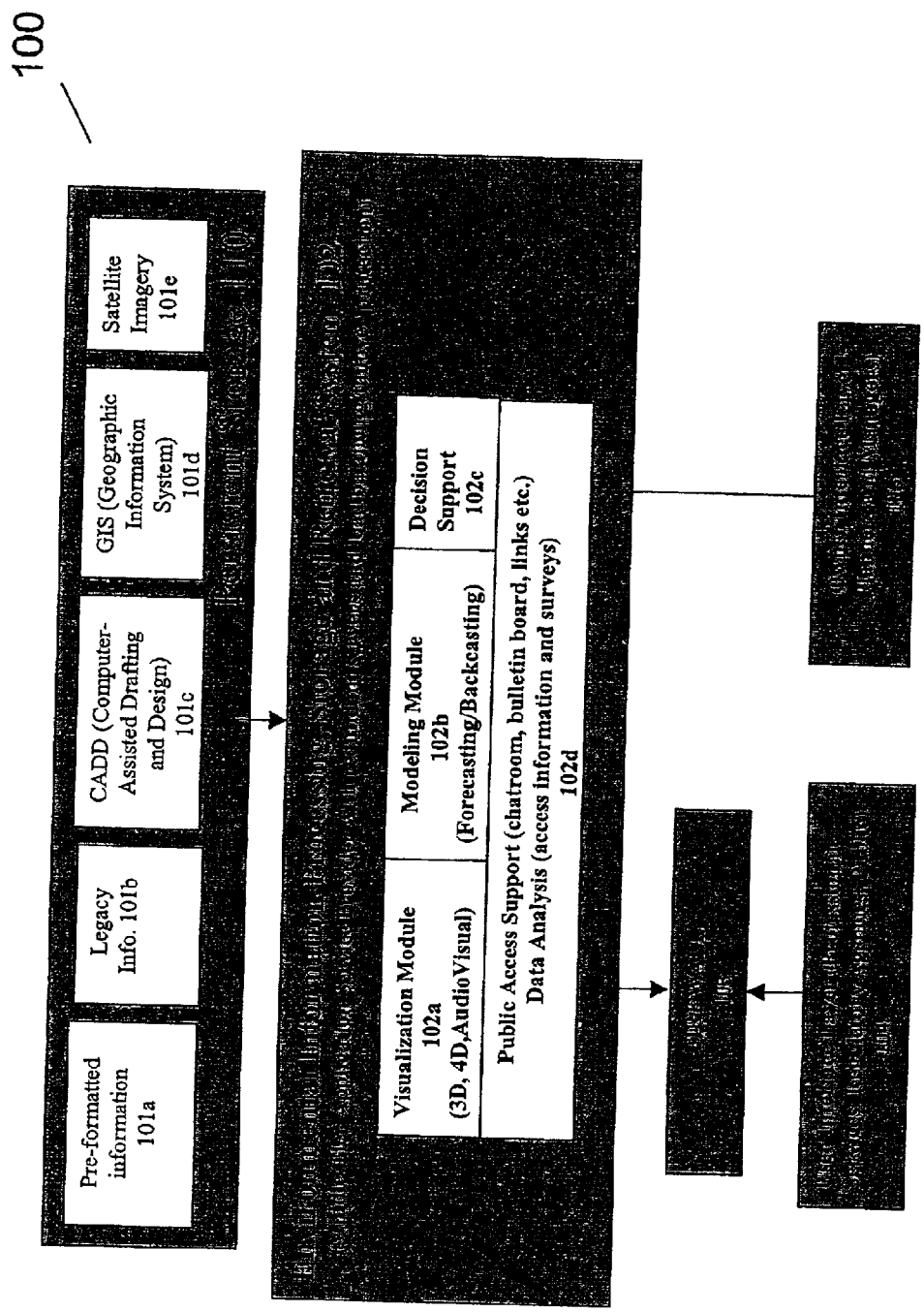
FIG. 1 illustrates a system architecture according to an embodiment of the present invention.

FIG. 1 illustrates system architecture 100 according to an embodiment of the present invention. System 100 includes a processing device having an article of manufacture, such as persistent storage 110 or computer readable memory in an embodiment of the present invention. A processing device includes, a mainframe computer, a desktop computer, a lap-top computer, a hand-held computer, a personal digital assistant, a telephone, a cellular telephone, a pager, an information appliance, or an equivalent thereof, singly or in combination, in alternate embodiments of the present invention. System 100 also includes environmental information 101 stored in persistent storage 110, environmental information processing, storage and retrieval system 102, firewall 103, user interface 104, and owner interface 105.

In an embodiment of the present invention, environmental information 101 includes a plurality of different types of environmental data describing the environment. In an embodiment of the present invention, environmental information 101 is preformatted and stored in different sections of persistent storage 110. In an embodiment of the present invention, persistent storage 110 is a computer readable memory that may include a magnetic hard disk, an optical disk, a floppy disk, CD-ROM ("Compact Disk Read-Only Memory"), DVD ("Digital Video Disk"), RAM ("Random Access Memory"), ROM ("Read-Only Memory"), or other readable or writeable data storage technologies, singly or in combination. Environmental information 101 includes numerical information (e.g. project are in square feet, noise in decibels, water quality in milligrams constituent per liter, traffic counts in cars per hour, traffic conditions in letter designation A through E) and narrative information (e.g. soil type by classification, likelihood of encountering archaeological artifacts in terms of highly likely, likely, unlikely, etc.) stored as preformatted information 101a. In an embodiment of the present invention, electronic environmental documents are stored in preformatted information 101a. Photographic and video images, animation, and images produced by software from data (e.g. computer-assisted drafting and design "CADD" and geographic information system "GIS" information), are stored as CADD 101c, GIS 101d and satellite imagery 101e. In an embodiment of the present invention, photographic and video images, animation and images are preformatted for retrieval. "Legacy" information or information derived from various sources which is not preformatted is stored in legacy information 101b. Environmental information 101 is processed for representation and publication in electronic environmental project documents as described below.

Figure 2:
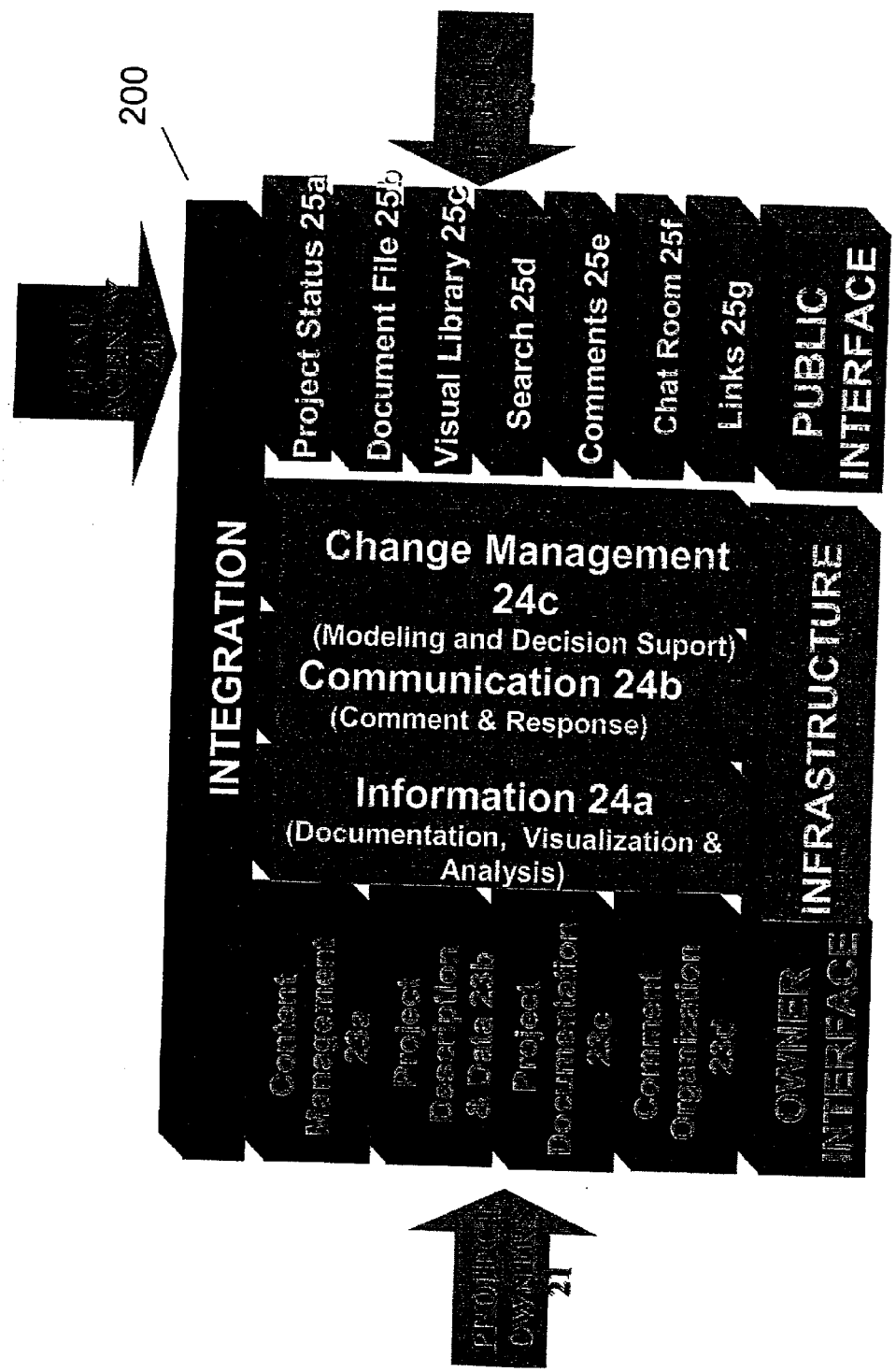
FIG. 2 illustrates software components according to an embodiment of the present invention.

System 102 also includes multiple software components stored in a computer readable memory in an embodiment of the present invention. Software components referenced in FIGS. 1 and 2 represent a software program, a software object, a software function, a software subroutine, a software method, a software instance, and a code fragment, singly or in combination. In an alternate embodiment, functions performed by software components illustrated in FIGS. 1 and 2 are carried out completely or partially by hardware.

In an embodiment of the present invention, visualization module 102a is used to present two-dimensional (2D), three-dimensional (3D), and four-dimensional (4D) and/or audio-visual representations of various types of environmental information relevant to an electronic environmental document. In an embodiment of the present invention, module 102a presents graphics (e.g. tables, graphs and coded maps including those containing iconographic images) obtained from environmental information 101. For example, information provided from environmental information 101 specifying the baseline traffic of a project site in trips per hour at various points in the vicinity of the project site, and further specifying the number of automobile trips caused by the construction of a proposed project may be represented in a table or a graph of projected trips per day, or represented on a map with color coding or iconographic representation to indicate the severity of traffic conditions produced by the impact of the additional trips, or further represented by a video clip in which the frequency of images of automobiles passing a given point of reference of the viewer appears to represent the anticipated traffic conditions.

Similarly, information provided from environmental information 101 specifying the maximum drainage of rain water in cubic feet per second projected to run off from a site may be represented in a table or a graph of projected runoff from the site, or represented on a map with color coding or iconographic representation to indicate the severity of soil erosion produced by the impact of the runoff, or further represented by a video clip in which the runoff in a channel passing a given point of reference of the viewer appears to represent the anticipated runoff conditions. Similar alternative representations are provided for the range of site conditions and environmental impacts generally anticipated for projects producing impacts that affect the environment, and the user as appropriate for characterization of the particular project may select alternative representations.

Modeling module 102b is used to provide forecasting and/or backcasting of the environmental impact of a project based on environmental information. For example, information provided from environmental information 101 specifying the baseline traffic of a project site, and further specifying the size of the proposed project in square feet, and the type of project (e.g. office building, retail store, industrial site, etc.) may be combined to forecast the number of automobile trips caused by the construction of a proposed project, and this information may be represented in a table, graph, map or video by the operation of modeling module 102b. This information can be further combined with projections of population growth in the general area or other factors influencing changes in baseline conditions, to produce additional forecasts of projected site conditions after construction of the proposed project.

Similarly, information provided from environmental information 101 specifying the area of the project site and the maximum projected rainfall and further specifying the amount of undeveloped area proposed for paving and the quality of surrounding soils can be combined to forecast the projected runoff and erosion potential, which can then be represented as a table, graph, map or video by the operation of modeling module 102b. Similar alternative forecasts are provided for the range of environmental impacts generally anticipated for projects producing impacts that affect the environment, and the user as appropriate for characterization of the particular project may select alternative representations. In each case the specific formulas and equations that are used to forecast impacts may be selected by the user, but their integration and processing to produce a variety of tables, graphs, maps and video images are provided by the software in 102b.

Decision support module 102c is used to obtain information from project owners, stakeholders and/or interested public concerning the value of various benefits and impacts produced by the project to determine the most preferred project characteristics. Information concerning the project provided by the operation of visualization module 102a or forecast by the operation of modeling module 102b, is presented in decision support module 102c in such manner that the user can indicate a range of values as appropriate to each impact, including narrative scalar information concerning the desirability of the benefit or impact (e.g. very good, good, fair, poor, very poor), numerical scalar information (1–100) or other means of indicating preference or value concerning various outcomes. Project characteristics and impacts are specifically represented by decision support module 102c to elicit appropriate scalars from a number of individual evaluators that are then stored and processed to produce a consensus preference of project outcomes. These outcomes may in turn be related to project characteristics through the operation of modeling module 102b (forecasting/backcasting) to "backcast" alternative project characteristics and impacts required to achieve desired outcomes. In each case the specific formulas and equations that are used to backcast outcomes and impacts may be selected by the user, but their integration and processing to produce a variety of tables, graphs, maps and video images are provided by modeling module 102b.

Public access support module 102d is used to allow access to environmental information and/or surveys in an embodiment of the present invention. In an alternate embodiment of the present invention, public access support module 102d provides chat rooms, bulletin boards and/or links for user comments.

Firewall 103 is a software and/or hardware component for protecting system 102 in an Internet embodiment of the present invention.

User interface 104 is a software component for users to access, store and/or retrieve environmental information from and to system 102. In an embodiment of the present invention, users are professional services, regulatory agencies and/or individuals in the public. Owner interface 105 is a software component for an individual, such as a project owner, project sponsor, project manager, planner, or lead agency, or other responsible entity, to access, store and/or retrieve environmental information from and to system 102. Owner interface includes utilities provided by public access support module 102d above, but in such manner as its use is limited to those parties specified by the owner, and may include access to subject matter not available to the general public.

In an Internet embodiment of the present invention, a processing device acting as a server is coupled to a persistent storage 110, such as a database. In an alternate embodiment, system 102 includes redundant servers having load balancing and fail over protection. User interface is a processing device, such as a desktop computer, coupled to system 102 via the Internet. In an alternate embodiment, system 102 is coupled to user interface by an intranet or local area network by a wired and/or wireless connection. In an embodiment of the present invention, user interface includes a graphic user interface and a web browser for accessing system 102, and in particular a web site on system 102. Similarly, owner interface 105 is a processing device coupled to system 102 via the Internet and also has a web browser.

In still another embodiment of the present invention, software components shown in FIGS. 1 and 2 are downloaded over the Internet.

FIG. 2 illustrates software architecture 200 according to an embodiment of the present invention. Software architecture 200 includes multiple components including software modules, user interfaces and data/graphics in an embodiment of the present invention. In an embodiment of the present invention, project owner 21 access, comments and inputs environmental information to system 102 using content management 23a, project description and data 23b, project documentation 23c and comment organization 23d. In an embodiment of the present invention, components 23a–d are input and perform the functions of public access support 102d and owner interface 105 shown in FIG. 1. For example, project owners 21, as described below, enter project description and data 23b, and manage project revisions and document development in 23c. Further, comment organization 23d manages the organization of the project team's, user or public comments on a particular electronic environmental project document.

In an embodiment of the present invention, information 24a, communication 24b and change management 24c are used to store, retrieve, visualize, model, analyze and organize comments regarding an electronic environmental document, and in particular environmental information. In an embodiment of the present invention, components 24a–c represent and perform the functions of environmental information 101, visualization module 102a, modeling module 102b and decision support module 102c in an embodiment of the present invention.

In an embodiment of the present invention, a public interface that is accessible by a lead agency 20 and/or member of the public 22 includes project status 25a, document file 25b, visual library 25c, search 25d, comments 25e, chat room 25f and links 25g components. For example, document file 25b is an electronic environmental report stored in persistent storage 110, and in particular preformatted information 101a shown in FIG. 1. Similarly, chat room 25f is an interface for discussing an environmental plan and is provided by public access support module 102d shown in FIG. 1 in an embodiment of the present invention. Public interface components 25a–25g are accessed and perform the functions of public access support 102d and user interface 104 as shown in FIG. 1 in an embodiment of the present invention.

Figure 12A:
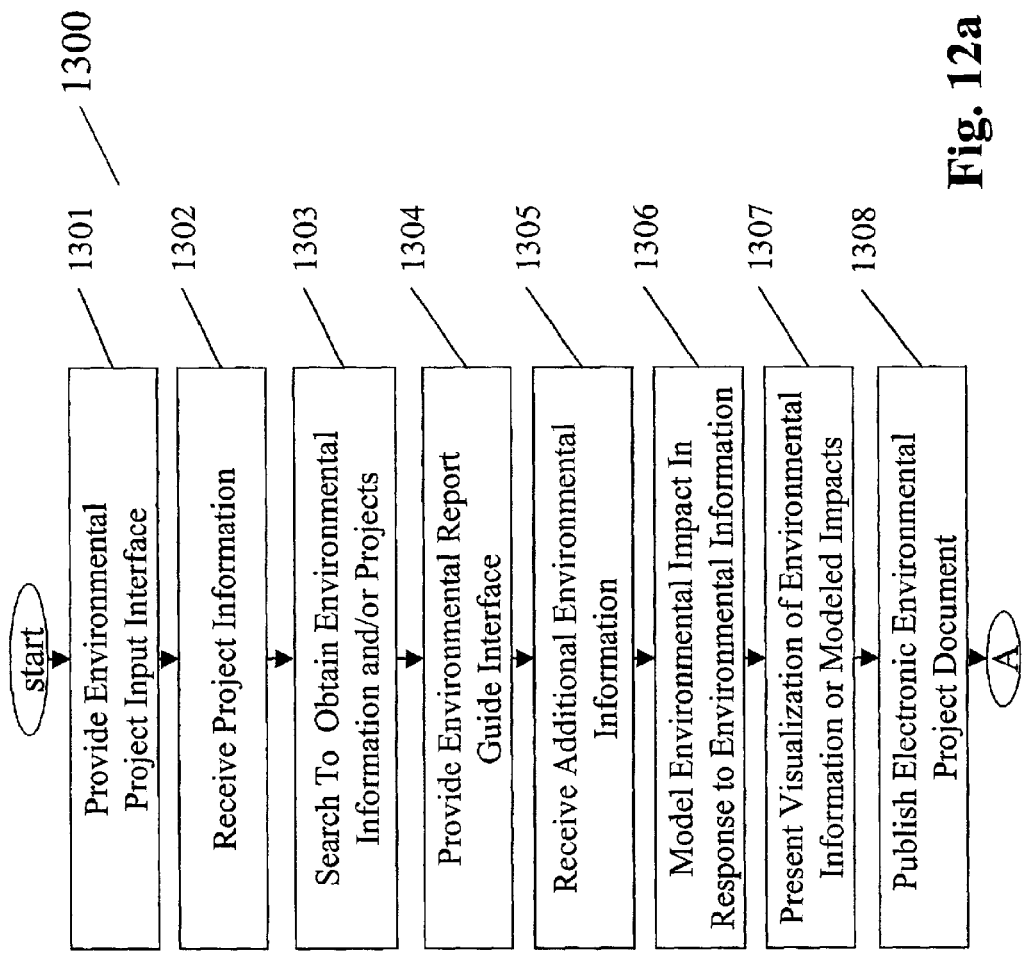
FIGS. 12a–b illustrates a method according to an embodiment of the present invention.
Figure 12B:
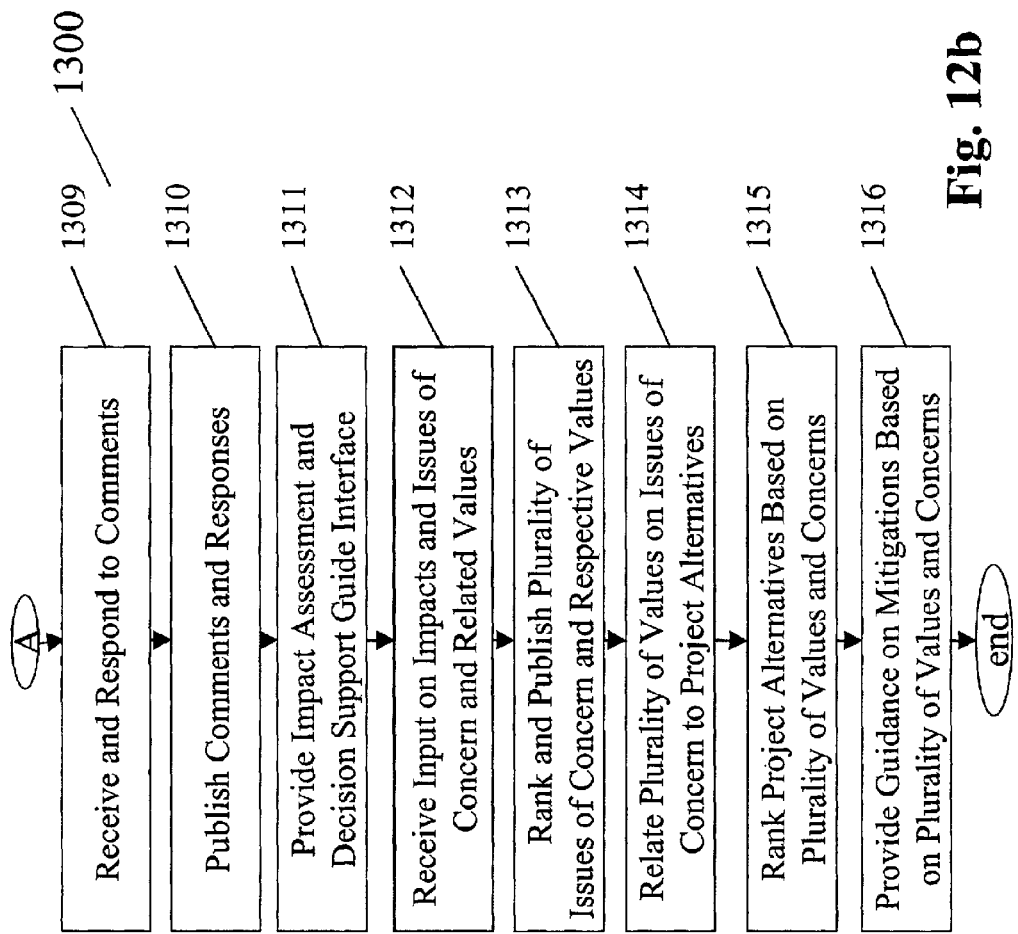

FIG. 12 illustrates a method 1300 for providing, communicating and evaluating an electronic environmental project document. In an embodiment of the present invention, software modules illustrated in FIGS. 1 and 2 perform method 1300. In an embodiment of the present invention, a logic box or step illustrated in FIGS. 12a–b may represent a software component, such as a software program, a software object, a software function, a software subroutine, a software method, a software instance, a code fragment, singly or in combination. In an alternate embodiment of the present invention, a logic box or step may be a software operation, hardware operation or user operation, singly or in combination. In alternate embodiments of the present invention, more or less steps are performed.

Figure 3:
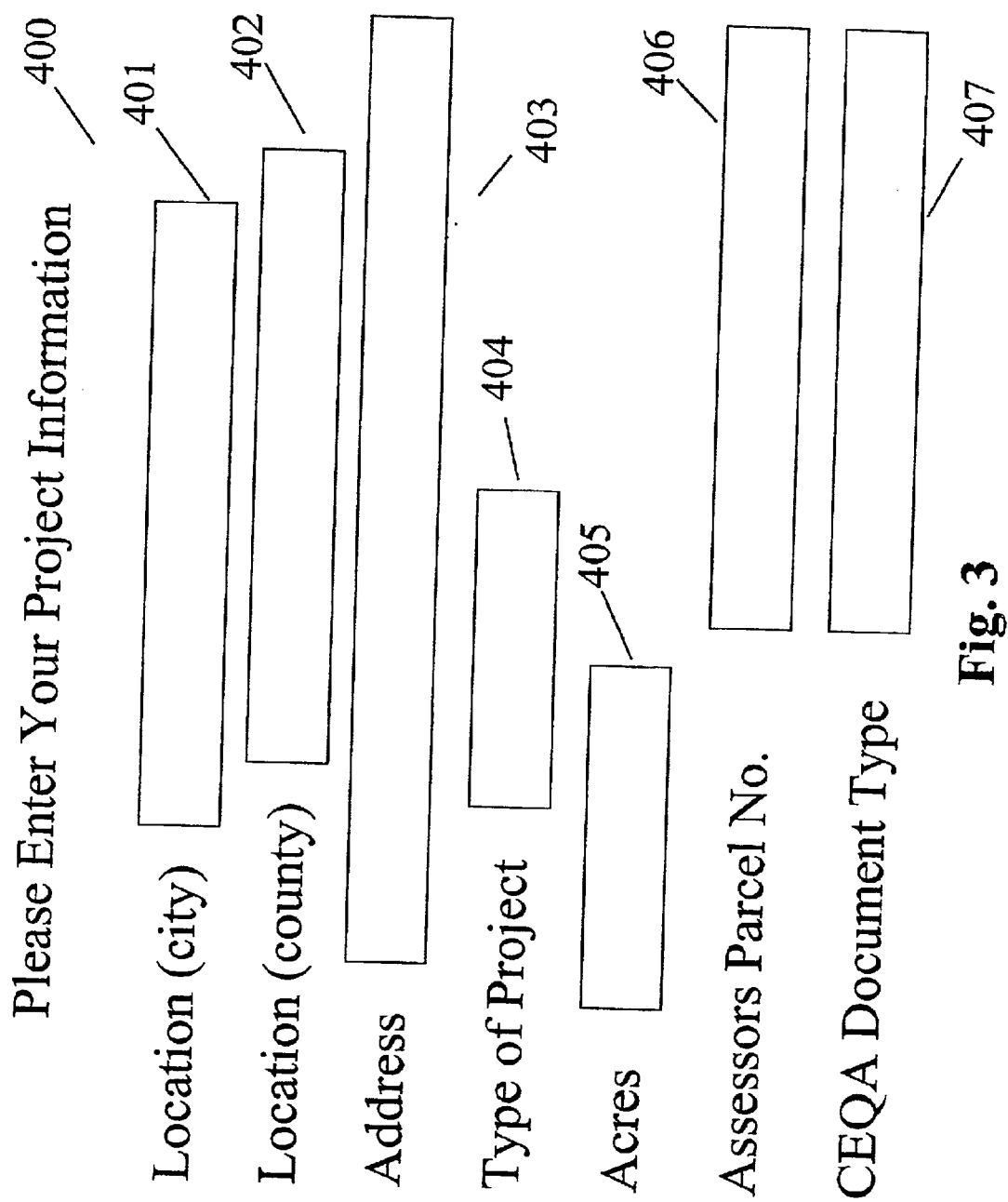
FIGS. 3 and 4 illustrate project information templates according to an embodiment of the present invention.

Method 1300 initiates by providing an owner, such as a project sponsor, or responsible entity, with a project document interface 400, such as shown in FIG. 3, as illustrated by logic block 1301. In an embodiment of the present invention, an electronic form with fields 401–407 is used for inputting environmental project information, such as a location (city), a location (county), an address, a type of project, number of acres, assessors parcel No. and/or document type. For example, a location (city) is entered in field 401 next to a location (city) label and a location (county) is entered into field 402. In alternate embodiments, a form with pop-up menus that may be selected by an owner is provided.

In an alternate embodiment of the present invention, an owner establishes an account with system 102 or establishes an appropriate volume for storage of data on an owner's processing device where the document will be prepared and published. To assist with document preparation, designated users with an appropriate password are able to access, modify, add to or delete information in the document throughout the document preparation and review process. In an embodiment of the present invention, an owner specifies privileges required for various degrees of access to a central file, including privileged access to alter the document during preparation.

In an embodiment of the present invention, the environmental information is received as illustrated by logic block 1302. In an embodiment of the present invention, project information is received by system 102 over the Internet from an owner processing device. In an alternate embodiment of the present invention, system 102 receives the environmental information from an owner manually inputting or loading environmental information into system 102.

Figure 4:
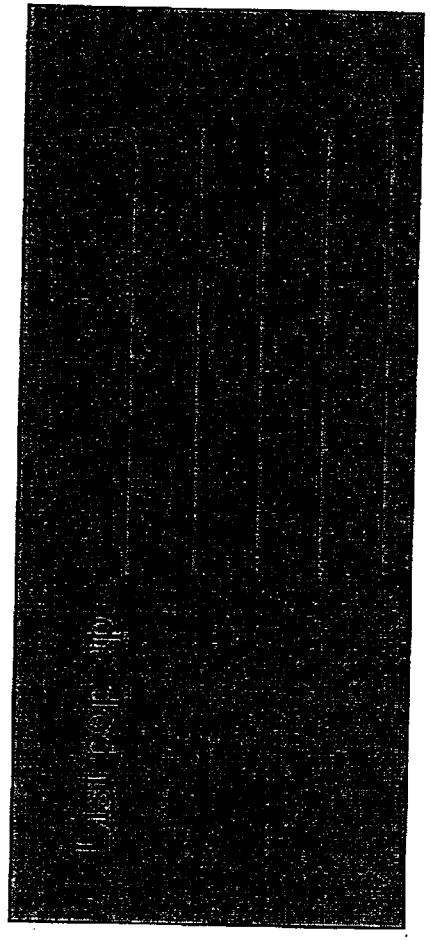

Project information is then displayed to an owner as illustrated by user interface 500 in FIG. 4. For example, user interface 500 shows the location of the project and the number of environmental impact reports ("EIR") or electronic environmental documents being currently processed by a particular reviewing entity. A list of pending environmental projects may also be shown. User interface also queries whether an owner wishes to share/use environmental information with other owners by entering yes/no field 501.

In an embodiment of the present invention, a user may search environmental information 101 to obtain similar electronic environmental documents and/or environmental information as illustrated by logic block 1303 and described below.

Document publication information is then obtained as illustrated by user interface 600 shown in FIG. 5. For example, an owner can select the format of the text and graphics of an environmental project document by selecting the appropriate yes/no field 602. Further, an owner can select whether other environmental information can be stored, such as project document, visualizations, modeling results, decisions support, review comments, bulletin board discussion, and/ chat room records, by selecting the appropriate fields 601. By storing an electronic environmental document, and in particular environmental information, in a predefined format, environmental documents and information may be easily modified and searched. In an embodiment of the present invention, environmental information is stored with an identifier indicating a type of environmental information. As described below, the type of environmental information may be traffic, geographic location, etc.

In an embodiment of the present invention, interface 600 queries whether the user would like to add visualization information (e.g. photographs, audio and video clips, animation, satellite imagery, and GIS) to the publication of electronic environmental project document. If an owner wishes to have the visualization information added, system 102 will accept user designated files or searches for an appropriate image, based on the entered location information, in persistent storage 100 in order to add images to an electronic environmental project document.

In an embodiment of the present invention, an electronic environmental document preparation guide is provided as illustrated by user interfaces 700, 800 and 900 shown in FIGS. 6–8. A document preparation guide helps a user prepare an electronic environmental document by providing the appropriate environmental information, guidance or queries in response to user input. For example, pertinent regulations for a project, such as municipal planning jurisdiction, mandatory filings, etc. are provided in response to a user entering project type and location. Other information, such as references to municipal, county, state or federal codes or regulations; checklists of required information; or listings of previously approved projects of similar type or samples of their documentation may also be provided.

In an alternate embodiment of the present invention, a list of similar environmental documents is provided in response to a user input. Similar environmental documents are stored for future reference to further guide the document preparation process in an embodiment of the present invention. In addition, similar documents may be used as examples and information may be abstracted from a number of documents, including the area and range of conditions surveyed, frequency and duration of sampling and specific qualities surveyed. In an embodiment of the present invention, links to appropriate regulatory sites for further guidance on document preparation is also provided.

In an embodiment of the present invention, a preprogrammed selection of templates or forms is provided to a user for preparing the electronic environmental document. In an embodiment of the present invention, templates are provided to owner interface 105, and in particular to a browser of an owner. An owner gathers information about site characteristics as required by the relevant government regulations and further described in various government checklists and enters the information in the appropriate location in the document template. For example, user interface 700 shown in FIG. 6 provides a table of contents for an electronic environmental document base on inputted user information, such as project location and type. A user is thus informed as to the topics that must be addressed in an electronic environmental document. If a user selects "Project Description" shown in FIG. 6, a template or user interface 800 for entering the appropriate "Project Description" information is provided. In an embodiment of the present invention, a pull down menu of possible selections or blank labeled fields to be filled in by a user is provided. Similarly, if a user selects "Traffic and Circulation" in user interface 700, template or user interface 900 shown in FIG. 8 is provided. A user then may enter affected streets and highways in field 901 and a local/regional impact model used for analysis in field 902. User interface 900 will then provide the appropriate model output, such as diagrams, tables, spreadsheets, visual simulation and/or user experience.

After obtaining environmental information obtained using an environmental guide interface as illustrated by logic block 1304, an electronic environmental document can be stored and eventually published as illustrated by block 1308 shown in FIG. 12a. In an embodiment of the present invention, an electronic environmental document is stored in preformatted document at section 101a of persistent storage 110. A user can enter key words in field 1001 of user interface 1000 shown in FIG. 9 for future retrieval of the stored electronic environmental project document and/or other environmental information as illustrated by logic block 1303 in FIG. 12b. In an alternate embodiment of the present invention, "metadata" (data about the contained information) including summary information about the types of information in a document, the nature and range of various impacts, etc. is also stored. Accordingly, system 102 is able to search stored environmental documents based on keywords, specific values or other user-specified indicators. Other software components then are able to access stored electronic environmental documents. For example, enhanced visualization, modeling of information under different conditions, support decision analysis and/or automatic tabulation of publicly inputted preferences may be performed as described below.

Figure 9:
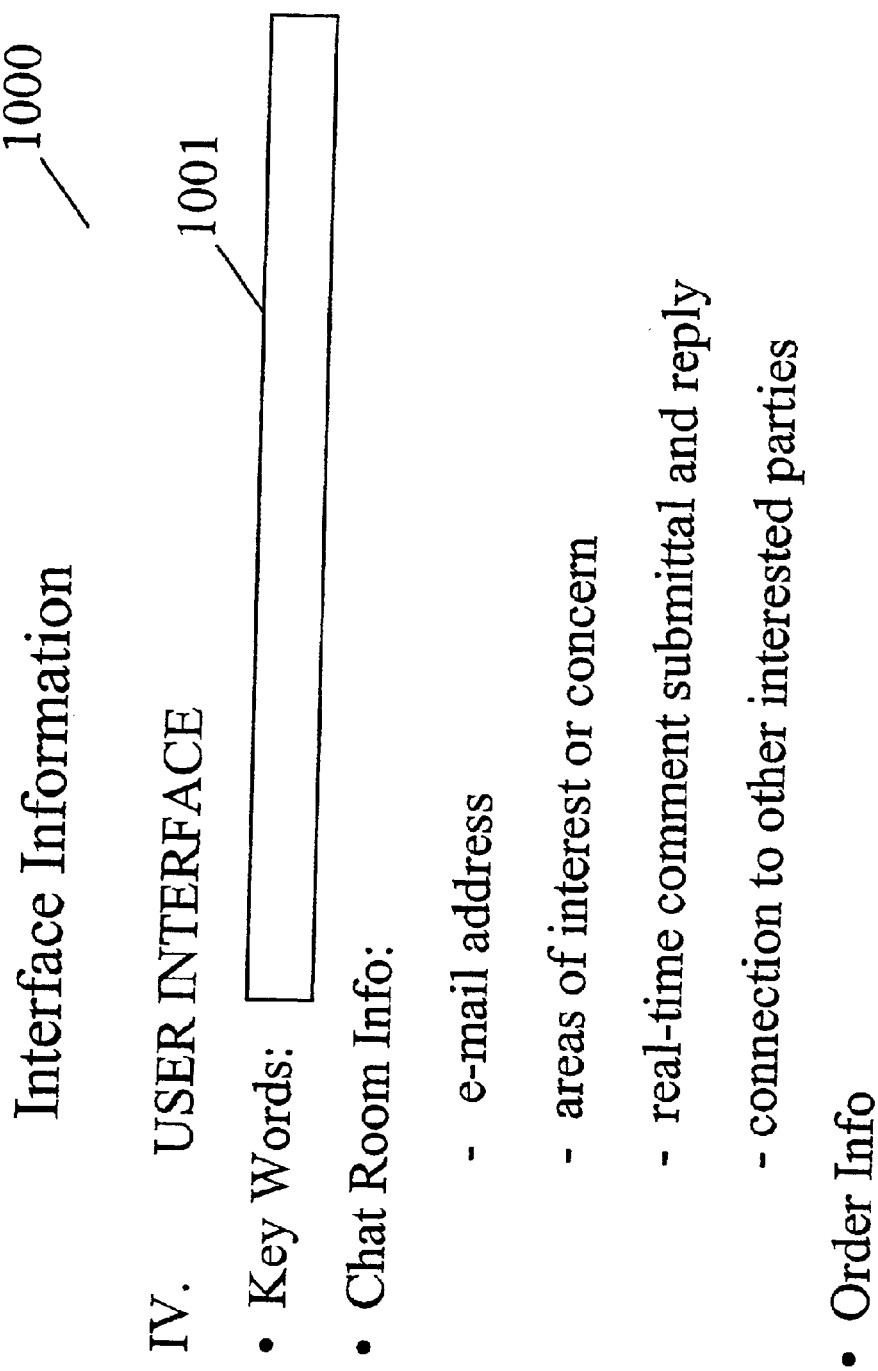
FIG. 9 illustrates a user interface information template according to an embodiment of the present invention.

When an owner determines that the environmental document is appropriate for public review, system 100 allows an owner to remove password access protection such that the information becomes accessible as read only by the public through the internet in an embodiment of the present invention. FIG. 9 illustrates a user interface 1200 provided to the public for accessing environmental information stored in system 100. User interface 1200 includes search icon 120 for initiating a search of environmental documents and environmental information pertinent to the project (including design information, environmental studies and formal legal submittals).

Bulletin board icon 121 is used for reading and writing to an electronic "bulletin board" where project reviewers or interested parties post status reports, comments or other pertinent information.

Project status icon 122 is used for reviewing a project schedule listing all pertinent dates and a calendar of scheduled activities, hearings, etc.

Order document icon 123 is used for ordering paper or other readable data storage technology (e.g. CD-ROM) copies of relevant documents.

Visual library icon 124 is used for viewing a library of photographs, videos and other graphic representations of the site (including artist renderings and video graphic models).

Links 125 icon is used for accessing relevant links as shown by list 1100 in FIG. 10 (Links may include links to project sponsor(s), permitting agency(ies), non-governmental organization(s) commenting on the project, similar projects or other projects in the same area, technological and scientific background relevant to the project, site conditions or environmental or socioeconomic impacts and/or relevant legal issues and legal precedent pertinent to the review process).

Interested parties use commenter chat room icon 126 for participating in a chat room for real time discussion of project issues.

Media coverage icon 127 is used for reviewing a library of media coverage pertaining to the site, the project or the project sponsor, and submit comments icon 128 for providing comments on an environmental project.

An electronic environmental document is then published locally by way of printer, display or other input/output devices or to a remote processing device over the Internet in embodiments of the present invention. An owner may publish select documents and related representations for select periods of time with variable authorization to revise documents and update information depending on level of permission given to select users. In an embodiment of the present invention an owner selects the "publish" option to receive a menu of information types that may be published as described in FIG. 5. An owner indicates by selecting the appropriate field on menu 601 which of the information types is to be published (e.g. "project document", "comments", "visualizations", "modeling results", "decision support", "alternative scenarios" etc.). In an embodiment of the present invention, an owner that wishes to publish all information can select an "all" option.

Once an electronic environmental document has been published, stakeholders can access it according to geographic location, jurisdiction, project date, type of project, special site characteristics and the types of mitigation employed. Information can also be selected based on various keywords or other pertinent characteristics. System 100 will return to a user a list of environmental documents which information matches the characteristics selected.

In an alternate embodiment of the present invention, an owner reviews a directory of all information stored in system 100, categorized so as to facilitate access.

Comments from project reviewers, stakeholders, interested parties and others are obtained as illustrated by logic block 1306. In an embodiment of the present invention, an individual uses interface 1200 shown in FIG. 11 to comment on a project, and in particular an electronic environmental project document. Comments are received, logged, acknowledged and responded to using the Internet in an embodiment of the present invention. Comments and respondents are tracked and analyzed in system 100 according to a variety of categories including origin, type of comment, frequency, etc.

System 100 also allows for modeling, including enhanced visualization, the environmental impact of a project, and of various alterations or modifications to a project as illustrated by logic blocks 1306 and 1307 shown in FIG. 12a. In particular, visualization module 102a provides enhanced visualization and modeling module 102b provides modeling output in response to user inputted environmental information.

Images associated with an environmental project are provided in real time (dynamic) and/or historic (static) manner in an embodiment of the present invention. Collective physical and nonphysical (e.g. socioeconomic) characteristics of a project may be shown by symbols, graphs, photographs, audiovisual media, animation and/or iconography in an embodiment of the present invention.

Audiovisual media includes audio and/or video data supplied by an owner that is geographically keyed to a location of a project site and modified to represent key characteristics of site conditions or experience.

Iconography includes pre-programmed and/or user-developed symbols that can be used to represent certain environmental or sociopolitical characteristics or conditions (e.g. stylized representations of cars representing traffic; shades of color representing levels of pollution, etc.).

Selected icons are automatically applied to geographical coordinates representing the area in which these conditions or characteristics exist at a scale indicating the degree of the condition or characteristic in an embodiment of the present invention.

Links to other sites that provide relevant site information, including real-time satellite imagery and aerial photographs are also provided in an embodiment of the present invention.

Visualization of future conditions may be accomplished by generating audiovisual or iconographic data or modifying user-supplied, geographically keyed audiovisual or iconographic data through the use of pre-programmed or user-supplied predictive formulae.

Model output specified by modeling module 102b may be represented in the form of numerical or graphic output, including animation, audio or video data, or iconography, color-coding or a combination of similar visualization techniques. Modeling module 102b generates and displays information regarding the environmental consequences of project features in response to user inputs.

In an embodiment of the present invention, system 100, and in particular software modules 102a and 102b, creates electronic representations including photographic, iconographic and audio-visual images that are easily interpreted as maps or pictures of current and future site conditions and project impacts ("visualization"). These visualized scenarios are then readily modified by changing site, project and mitigation specifications, enabling an owner or reviewer to perform "what if?" analysis of project impacts ("forecast modeling"). Mitigation specifications are project requirements that reduce the environmental impact of a project.

In an embodiment of the present invention, an owner or reviewer designates a base map of a site consisting of a two- or three-dimensional GIS file, stored in persistent storage 110 of system 100, with specific coordinates for all key features of the project and site area. A GIS file can be static or moving, historic or real time. An owner or reviewer then selects the type of visualization aide to apply to the base map for optimum representation of individually reviewed or multiple overlapping site conditions from visualization module 102a.

Prior to visualization, an owner or reviewer specifies coordinates on the GIS base map corresponding to the boundaries of the conditions or characteristics of concern (e.g. concentration of chemical constituents in air, water or soil, distance from nuisance conditions, etc.).

Visualization module 102a provides an owner or reviewer with a variety of visualization aids from which to choose, including color overlay, iconographic representation, and photographic or audiovisual images. The colors, icons or images are keyed to the appropriate coordinates such that the ultimate representation of site conditions are enhanced by the addition of the visualization aids.

An owner or reviewer may either query system 100, and in particular modeling module 102b, to calculate the effect of the proposed mitigation on site conditions, or calculate and enter the projected site conditions by some other means. An owner or reviewer may also specify project characteristics that might impact site conditions according to predetermined formulae or standard formulae provided by modeling module 102b for owner or reviewer selection. In an alternate embodiment, an owner or reviewer specifies proposed mitigations that will reduce the calculated impact of the proposed project. In either case, modeling module 102b modifies the representation of site conditions ("scenario") according to the projected changes due to the project impact and mitigation.

In an embodiment of the present invention, environmental information is input into modeling module 102b for back-casting. Ranked preference which have been obtained from decision support module 102c and which specify the desired outcome of the project in terms of individual and cumulative impacts are input into modeling module 102b which then "backcasts" project characteristics to determine what features of a project will be necessary to obtain the desired preferences of the reviewers.

After an electronic environmental document is published as illustrated by logic block 1308, stakeholders and other interested parties may provide comments and respond to comments as illustrated in logic block 1309. In an embodiment of the present invention, public access support module 102d illustrated in FIG. 1 is responsible for this function. Comments and responses then may be published as illustrated by logic block 1310.

To support individual and group decision making, a plurality of concerns regarding a project and reviewers' respective values is obtained by decision support module 102c and is represented by logic blocks 1311–1316 shown in FIG. 12b. Support module 102c allows an owner and project reviewers to register and prioritize their values and concerns about the project and its impacts ("decision support"), and to evaluate various project alternatives based on the individual or aggregated values and concerns based on a process of sequential query and review.

In an embodiment of the present invention, a reviewer of the project will be asked a series of owner-defined questions about what aspects of the project or its impact are of greatest importance to a reviewer on a numerical scale as illustrated by logic blocks 1311–1312.

Issues of concern related to project impacts will then be weighted according to the cumulative average value and published as illustrated by logic block 1313.

The project is then evaluated as illustrated by logic block 1314 according to the weighted criteria developed by logic block 1313 in such a manner as to produce a numerical rating reflecting the preference of the reviewer.

Where more than one project alternative is available, system 100 will then present which of the alternatives best meets the set of prioritized concerns as illustrated by logic block 1315. To develop new alternatives most likely to meet reviewers' needs, system 100 also generates new scenarios that match the preferred characteristics defined by decision support module 102c, and specifies new project characteristics ("backcast modeling") as illustrated by logic block 1316.

As can be seen, system 100 develops evaluation criteria and evaluates user responses to project alternatives in an interactive manner. System 100 includes the ability to survey reviewers in unison or separately, conjointly or online, to determine preferences with respect to criteria and preferences about project alternatives. System 100 allows reviewers to observe the tabulation process and to alter criteria, rankings and preferences for the purpose of evaluating changed outcomes.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A method for providing an electronic environmental document, including project information about: an environment-modifying natural event or construction project ("project"); a natural, constructed, or socioeconomic feature in the area of the project ("setting"); a change to the setting brought about by the project ("impact"); or a feature designed to ameliorate a potential environmental impact of the project ("mitigation"); comprising the steps of:
   (a) receiving project information about the project, setting, impact or mitigation;
   (b) providing an electronic document preparation guide in response to the information;
   (c) receiving environmental information requested in the document preparation guide; and
   (d) publishing the electronic environmental document, including at least some of the environmental information, for environmental study, evaluation or planning.

2. The method of claim 1, wherein the steps are performed by software stored in memory of a processing device coupled to the Internet.

3. The method of claim 2, wherein the publishing step includes providing the electronic environmental project document to users on the Internet.

4. The method of claim 3, further comprising the step of:
   (e) receiving comments regarding the environmental project document.

5. The method of claim 2, wherein the providing step further includes providing an electronic form having an environmental data entry field and label in response to the project information.

6. The method of claim 1, wherein the steps are performed by a processing device.

7. The method of claim 1, wherein the providing step further includes providing an electronic form having an environmental data entry field and label in response to the project information.

8. The method of claim 1, wherein the providing step further includes providing a pop-up menu of environmental forms for entering physical, geographical, biological and socioeconomic information in response to the project information.

9. The method of claim 1, further comprising the step of adding graphics information to the project information and the publishing step includes publishing the graphics information.

10. The method of claim 1, wherein the graphics information includes video and animation information and the publishing step includes publishing the video and animation information.

11. The method of claim 1, wherein an environmental impact is represented graphically in the publishing step in response to inputting physical, geographical, biological and socioeconomic information.

12. The method of claim 1, wherein a first and a second environmental impact is represented graphically in the publishing step in response to inputting physical, geographical, biological and socioeconomic information.

13. The method of claim 1, further comprising the step of:
   (e) forecasting an environmental impact in response to the environmental information.

14. The method of claim 13, wherein the forecasting step comprises the steps of:
   (f) forecasting a first environmental impact in response to a first type of environmental information;
   (g) forecasting a second environmental impact in response to a second type of environmental information; and,
   (h) providing a visual representation of the first and second environmental impact.

15. The method of claim 1, further comprising the steps of:
   (e) backcasting alternative project characteristics in response to a predetermined outcome.

16. The method of claim 15, further comprising the steps of:
   (f) backcasting a first project characteristic in response to a first type of project outcome;
   (g) backcasting a second project characteristic in response to a second type of project outcome; and,
   (h) providing a visual representation of the first and second project characteristic.

17. The method of claim 1, further comprising the step of:
   (e) searching a data base to obtain environmental information for the environmental project.

18. The method of claim 17, wherein the environmental information is stored with an identifier indicating a type of environmental information.

19. The method of claim 18, wherein the type of environmental information is traffic.

20. The method of claim 18, wherein the type of environmental information is geographic location.

21. The method of claim 18, wherein the type of environmental information is socioeconomic.

22. The method of claim 1, further comprising the step of:
   (e) searching a data base to obtain environmental information according to an identifier indicating a type of environmental information.

23. The method of claim 1, further comprising the step of:
   (e) querying a plurality of user to obtain respective issues of concern;
   (f) obtaining values associated with the respective issues of concern; and,
   (g) ranking the issues of concern in response to the respective values.

24. The method of claim 23, further comprising the step of:
   (h) determining a consensus preference of project alternatives according to a weighted issues of concern and values.

25. The method claim 1, wherein at least some of the environmental information in step (d) is stored with metadata.

26. The method of claim 25, wherein the metadata terms are contained in a thesaurus to facilitate retrieval of environmental information.

27. A method for evaluating an environmental project, comprising the steps of:
- (a) receiving project information regarding an environmental project;
- (b) providing a document preparation guide in response to the project information;
- (c) receiving environmental information requested in the document preparation guide;
- (d) publishing an electronic environmental project document including the environmental information;
- (e) receiving comments regarding the environmental project document;
- (f) forecasting an environmental impact in response to the environmental information;
- (g) backcasting alternative project characteristics to achieve a desired project;
- (h) searching a data base to obtain environmental information for the environmental project;
- (i) obtaining a plurality of issues of concern having respective values; and,
- (j) determining a consensus preference of project alternatives in response to weighted issues of concern and values.

28. The method of claim 27, wherein the steps are performed by a plurality of software modules stored on a computer readable medium.

29. The method of claim 27, wherein at least some of the environmental information in step (c) is also stored with metadata.

30. A method for accessing environmental information via the Internet, comprising the steps of:
- (a) receiving environmental information regarding a proposed environment-modifying project, including information about: an environment-modifying natural event or construction project ("project"); a natural, constructed, or socioeconomic feature in the area of the project ("setting"); a change to the setting brought about by the project ("impact"); or a feature designed to ameliorate a potential environmental impact of the project ("mitigation");
- (b) storing at least some of the environment information with metadata;
- (c) receiving a request via the Internet for requested environmental information, the requested information being the environmental information itself or any information associated with metadata or other information derived at least in part from the environmental information;
- (d) relating keywords, specific values or other user-specified indicators to metadata and environmental information to facilitate retrieval of requested environmental information; and
- (e) retrieving the requested environmental information.

31. The method of claim 30, wherein the request in step (c) is made at least in part to comply with regulatory requirements associated with the proposed environment-modifying project.

32. The method of claim 30, wherein the environmental information received in step (a) is associated with a first proposed environment-modifying project and the environmental information retrieved in step (d) is used or intended to be used at least in part to comply with regulatory requirements associated with a second proposed environment-modifying project.

* * * * *